(12) United States Patent
Sikora

(10) Patent No.: US 12,078,471 B2
(45) Date of Patent: Sep. 3, 2024

(54) DEVICE AND METHOD FOR DETECTING AN OBJECT

(71) Applicant: Sikora AG, Bremen (DE)

(72) Inventor: Harald Sikora, Bremen (DE)

(73) Assignee: SIKORA AG, Bremen (DE)

(*) Notice: Subject to any disclaimer, the term of this patent is extended or adjusted under 35 U.S.C. 154(b) by 591 days.

(21) Appl. No.: 17/275,733

(22) PCT Filed: Sep. 2, 2019

(86) PCT No.: PCT/EP2019/073341
§ 371 (c)(1),
(2) Date: Mar. 12, 2021

(87) PCT Pub. No.: WO2020/053016
PCT Pub. Date: Mar. 19, 2020

(65) Prior Publication Data
US 2022/0034648 A1 Feb. 3, 2022

(30) Foreign Application Priority Data
Sep. 13, 2018 (DE) ............... 10 2018 122 391.9

(51) Int. Cl.
*G01B 11/06* (2006.01)
*G01B 11/10* (2006.01)
*G01B 11/24* (2006.01)

(52) U.S. Cl.
CPC ........ *G01B 11/0691* (2013.01); *G01B 11/105* (2013.01); *G01B 11/24* (2013.01)

(58) Field of Classification Search
None
See application file for complete search history.

(56) References Cited

U.S. PATENT DOCUMENTS

| | | | |
|---|---|---|---|
| 5,493,126 A | 2/1996 | Taylor et al. | |
| 6,172,364 B1 | 1/2001 | Fritz et al. | |
| 2007/0252992 A1 | 11/2007 | Itsuji | |
| 2008/0060652 A1 | 3/2008 | Selvarajan et al. | |
| 2009/0070068 A1 | 3/2009 | Aso et al. | |
| 2014/0209802 A1 | 7/2014 | Itsuji | |

(Continued)

FOREIGN PATENT DOCUMENTS

| | | |
|---|---|---|
| CN | 101310194 A | 11/2008 |
| CN | 101566615 A | 10/2009 |

(Continued)

OTHER PUBLICATIONS

CN 201980059739.0, filed Sep. 2, 2019; Office Action dated Aug. 15, 2022 (10 pages).

(Continued)

*Primary Examiner* — Edwin C Gunberg
(74) *Attorney, Agent, or Firm* — Barclay Damon LLP

(57) ABSTRACT

A device for detecting an object conveyed through a measuring region comprises a transmission apparatus configured to emit measuring radiation onto the outer contour of the object. The measuring radiation comprises a frequency in a range of one of gigahertz and terahertz. A protective mesh is positioned between the measuring region and at least one of the transmission apparatus and the receiving apparatus. The protective mesh is transparent for the measuring radiation and permeable to a gas.

12 Claims, 2 Drawing Sheets

(56) References Cited

U.S. PATENT DOCUMENTS

| | | |
|---|---|---|
| 2016/0265910 A1 | 9/2016 | Price et al. |
| 2017/0209802 A1 | 7/2017 | Sisamos |
| 2018/0009418 A1 | 1/2018 | Newman |

FOREIGN PATENT DOCUMENTS

| | | |
|---|---|---|
| CN | 101644686 A | 2/2010 |
| CN | 102621111 A | 8/2012 |
| CN | 103149606 A | 6/2013 |
| CN | 104272091 A | 1/2015 |
| CN | 104520730 A | 4/2015 |
| CN | 105917212 A | 8/2016 |
| CN | 205717765 U | 11/2016 |
| CN | 107219237 A | 9/2017 |
| CN | 107328362 A | 11/2017 |
| CN | 207570489 U | 7/2018 |
| DE | 102008004037 A1 | 7/2009 |
| DE | 102013217038 A1 | 3/2015 |
| DE | 102014212633 A1 | 12/2015 |
| DE | 102016109087 A1 | 11/2017 |
| DE | 202016008526 A1 | 5/2018 |
| DE | 102017112073 A1 | 12/2018 |
| EP | 2607870 A1 | 6/2013 |
| EP | 2620741 A1 | 7/2013 |
| JP | 2007108002 A | 4/2007 |
| JP | 2014019708 A | 3/2014 |
| JP | 2015219129 A | 7/2015 |
| JP | 2016102226 A * | 6/2016 |
| JP | 2018084434 A | 5/2018 |
| JP | 197804613 A | 2/2021 |
| KR | 2000-0064493 A | 11/2000 |
| WO | 2017/016740 A1 | 2/2017 |

OTHER PUBLICATIONS

CN 201980059739.0, filed Sep. 2, 2019; English translation of Office Action dated Aug. 15, 2022 (8 pages).

THORLABS; "THz Bandpass filters : 10mm-590mm center wavelength"; FB19M10; Feb. 7, 2018 (4 pages).

Starr, Trevor FL.; "Pultrusion applications—a world-wide review"; Pultrusion for engineers; retrieved from the Internet <http://ebookcentral.proquest.com>; Nov. 12, 2019 (34 pages).

PCT/EP2019/073341, filed Sep. 2, 2019, International Search Report and Written Opinion, dated Nov. 14, 2019 (11 pages).

PCT/EP2019/073341, filed Sep. 2, 2019, English translation of International Search Report, dated Nov. 14, 2019 (3 pages).

JP 20210505894, filed Sep. 2, 2019 Office Action dated Jun. 29, 2022 (3 pages).

KR 20217009606, filed Sep. 2, 2019; Office Action dated Nov. 11, 2022 (5 pages).

KR 20217009606, filed Sep. 2, 2019; English Translation of Office Action dated Nov. 11, 2022 (4 pages).

* cited by examiner

DEVICE AND METHOD FOR DETECTING AN OBJECT

CROSS REFERENCE TO RELATED INVENTION

This application is a national stage application pursuant to 35 U.S.C. § 371 of International Application No. PCT/EP2019/07334 filed on Sep. 2, 2019, which claims priority to, and benefit of, German Patent Application No. 10 2018 122 391.9, filed Sep. 13, 2018, the entire contents of which are hereby incorporated by reference.

FIELD OF TECHNOLOGY

The invention relates to a device for detecting an object being conveyed through a measuring region of the device by means of a conveying apparatus, comprising a transmission apparatus for emitting measuring radiation with a frequency in the gigahertz or terahertz range onto the outer contour of the object and a receiving apparatus for receiving the measuring radiation that is reflected from the object. The invention also relates to a corresponding method of detection.

With such devices, the diameter of tubes, for example, can be determined. Transmission apparatuses are known which emit measuring radiation in the gigahertz or terahertz range. Such measuring radiation is largely insensitive to disruptions, as can occur as a result of steam or similar. The measuring radiation emitted by the transmission apparatus is reflected by the tube and returns to the receiving apparatus. An evaluation apparatus can measure the distance from the transmission and receiving apparatus to the tube, for example by means of a propagation delay measurement. If such a measurement takes place, for example, on different sides of the tube, the diameter can be determined in this manner. The outer contour, for example an ovality or the like, can also be detected by measuring over multiple measuring points distributed over the circumference of the tube.

BACKGROUND

When producing tubes, it is generally desired to measure the outer contour while the tube is still being formed or as soon as possible after the final formation of the tube so that interventions or changes in the production parameters can be made at an early stage if necessary and rejects can be prevented. For example, when producing metal tubes by means of rolling, the rollers are cooled by means of water, which leads to heavy steam development. Contaminant particles such as metal dust, cinder or the like are also often found in this environment. In particular when producing plastic tubes, what is known as a calibration sleeve made of metal can be used, against which the still soft, plastic tube is sucked, for example by applying a vacuum, thus obtaining the final shape. Cooling with water takes place here as well, which again leads to considerable steam development. Optical measuring apparatuses have considerable difficulties in such measuring environments.

The impairment of the measuring results due to contaminant particles when measuring objects in such a measuring environment is also problematic when using terahertz or gigahertz radiation. In addition, the transmission and receiving apparatuses in the rough measuring environment explained are subjected to high temperatures, which can lead to corresponding disruptions or damage. If, on the other hand, the outer contour is detected at a later point in time, when the measuring environment is less critical, in order to avoid this problem, a considerable amount of rejects results in the event of any undesired deviations of the production parameters.

It is also often desired to measure and assess the thickness, width, planarity and/or surface condition when producing or processing, for example, heavy plates, hot strip plates or cold strip plates. In this case, it is also often necessary to arrange the transmission and receiving apparatuses beneath the product to be measured. The transmission and receiving apparatuses are then in turn subjected to considerable con tar contamination risks.

Starting from the prior art explained, the object of the invention is to provide a device and a method of the type mentioned at the outset that deliver reliable measuring results even in a rough measuring environment, as explained, and therefore minimize the amount of rejects when producing the object to be detected.

BRIEF SUMMARY OF THE INVENTION

For a device of the type mentioned at the outset, the invention achieves the object by arranging a protective mesh, which is transparent for the measuring radiation and permeable for gas, between the transmission apparatus and/or the receiving apparatus on one side and the measuring region on the other side.

The object to be detected is conveyed through the measuring region of the device according to the invention during the measurement. For this purpose, the device comprises a corresponding conveying apparatus. The object can be, for example, a strand-shaped object such as a tube, in particular a strand-shaped object such as a tube made of a metal such as steel, or plastic or glass. The object to be detected can also be an object lying basically along a plane, for example a plate, in particular a heavy plate, a hot strip plate or a cold strip plate. The invention also relates to a system, comprising the device according to the invention and the object to be detected. In this case, at least one transmission apparatus and/or at least one receiving apparatus of the device can be arranged beneath the object to be detected. Depending on the material, the object to be detected may still have a very high temperature during the measurement, for example steel tubes may have a temperature of over 1000° C. or glass tubes a temperature of over 2000° C.

To detect the object, the transmission apparatus emits electromagnetic measuring radiation with a frequency in the gigahertz or terahertz range. The transmission apparatus can emit, for example, measuring radiation in the frequency range of 0.001 terahertz to 6 terahertz, preferably in the frequency range of 0.02 to 3 terahertz. In particular, the measuring radiation can emit radio waves. Such measuring radiation is particularly well suited for measuring in a rough environment, since it is largely insensitive to disruptions from contamination of the measuring path due to steam or the like. The measuring radiation hits the outer contour of the object, is reflected by it, and reaches the receiving apparatus which detects it as a measuring result. On this basis, a distance from the transmission and receiving apparatuses to the object can be determined, for example in a manner known per se, based on a propagation delay measurement. This makes it possible, for example, to determine the diameter and/or the wall thickness and/or the outer contour of the object, in particular when several measuring locations distributed over the circumference of the object are measured. In the case of a planar object, for example its width, planarity and/or surface condition or, by providing multiple transmission and receiving apparatuses on different sides, its thickness can be measured. In this manner, for example, deviations of the outer contour from a given shape, for example a circular cross-sectional shape, in particular an ovality, or from a given thickness or planarity can be detected. On this basis, controlling interventions in the production parameters of the production of the object can be made.

In an embodiment, a protective mesh is arranged between the transmission apparatus and/or the receiving apparatus on one side and the measuring region in which the object to be detected is located during the measurement on the other side. The protective mesh is at least nearly transparent for the measuring radiation. The lattice constant of the protective mesh can be considerably smaller than the wave length of the measuring radiation. It is also possible for the protective mesh to absorb a portion of the measuring radiation. However, in particular the predominant portion of the measuring radiation passes through the protective mesh, so that the highest possible amplitudes are available for the measurement according to the invention. Of course, the protective mesh can also be completely transparent for the measuring radiation. In addition, the protective mesh is also permeable to gas, in particular permeable to air. The transmission apparatus and the receiving apparatus can be arranged basically at the same location or directly next to each other. A common protective mesh can then protect both the transmission apparatus and the receiving apparatus. However, it is also conceivable for the transmission apparatus and the receiving apparatus to be arranged at different locations. It is also possible for multiple, for example two, protective meshes to be provided, of which one protects the transmission apparatus and one protects the receiving apparatus.

The protective mesh provided according to the invention protects the transmission apparatus and the receiving apparatus from contaminant particles, cooling liquid such as water, or harmful gases, in particular, the protective mesh prevents such disruptive components from being able to enter the region of the measuring sensors, that is to say the transmission apparatus and the receiving apparatus. Moreover, the protective mesh also disperses heat radiation away from the measuring sensors. This protects the measuring sensors from high temperatures. As a result of the lattice of the protective mesh, it has defined openings through which gas, m particular air, can flow. Due to the gas or air permeability, the protective mesh is cleaned of contaminant particles even by the normal air exchange. This air exchange also advantageously already leads to a cooling of the transmission apparatus and receiving apparatus. In addition, the gas-permeable design of the protective mesh allows the protective mesh to be kept free of contaminants particularly reliably, in particular by flushing, as will be explained in more detail below. This is of great importance in particular in the rough environmental conditions explained at the outset. It enables the device according to the invention to deliver secure measuring results even in rough measuring environments in a reliable manner, so that rejects can be minimized.

According to a particularly practical embodiment, the transmission apparatus and the receiving apparatus can be formed by a transceiver. Such a transceiver combines the transmission and receiving apparatuses, which are then practically arranged at the same location.

According to another embodiment, the protective mesh can be formed by a glass fiber fabric. A glass fiber fabric is particularly well suited for the purposes according to the invention. On the one hand, it can be permeated well by gas and is in particular transparent for radio waves. On the other hand, it has a high resistance to contaminants and heat. In principle, however, other materials are also conceivable, for example a ceramic filter material or similar.

According to another embodiment, the transmission apparatus and the receiving apparatus can be arranged in a housing, wherein the protective mesh closes a housing opening facing the measuring region. Such a housing achieves a particularly secure protection from disruptive influences from the environment. The housing can be closed in particular except for the protective mesh and an inlet that may be provided for a flushing gas.

In an embodiment, the inventive device may also comprise a flushing apparatus for flushing the protective mesh with a flushing gas. In a particularly simple manner, flushing air can be considered as the flushing gas. A slight overpressure can be maintained in the housing by the flushing apparatus, which further reduces the risk of contaminants entering. Flushing gas is introduced into the housing by the flushing apparatus. The flushing gas then flows in particular through the gas-permeable protective mesh and escapes, for example, into the environment. As a result, contaminant particles or similar collecting in the region of the protective mesh are also transported away and the protective mesh is thus cleaned for the measurement. In addition, the flushing further cools the transmission apparatus and receiving apparatus.

According to another embodiment, the flushing apparatus can be configured to continuously flush the protective mesh with the flushing gas before, during and/or after a measurement. This keeps the protective mesh reliably free of contaminants at all times.

Additionally or alternatively, it is also possible for the flushing apparatus to be designed to intermittently flush the protective mesh with the flushing gas before, during and/or after a measurement. An intermittent flushing, in particular with a considerably higher gas pressure as compared to the continuous flushing, can reliably release more stubborn or larger mesh contaminants. The intermittent flushing can take place, for example, in defined time intervals or independently of measuring results of the device.

In another embodiment, the device may also comprise an evaluation apparatus, to which measurement values from the receiving apparatus are applied and which is configured to determine the diameter and/or the wall thickness and/or the outer contour of the object based on the measurement values. This can be done by the evaluation apparatus in a manner known per se using a propagation delay measurement. Such an evaluation is in principle known to a person skilled in the art and will not be described in more detail.

In another embodiment, the device may also comprise a control and/or regulating apparatus, to which measurement values from the receiving apparatus and/or evaluation data from the evaluation apparatus are applied and which is configured to control and/or to regulate a process for producing the object based on the measurement values from the receiving apparatus and/or the evaluation data from the evaluation apparatus.

According to another embodiment, the evaluation apparatus can be configured to activate the flushing apparatus to intermittently and/or to continuously flush the protective mesh with the flushing gas when the radiation intensity measured by the receiving apparatus changes. If the protective mesh is contaminated, this can lead to a reduced permeability and/or an increased absorption of the measuring radiation. This can also lead to an increased reflection of the measuring radiation off of the protective mesh and therefore to an increased intensity of the radiation echo, for example due to metal dust or water. Such effects can be detected based on a change in the radiation intensity received by the receiving apparatus, in particular a change in the radiation intensity across all of the measurement values or a change in the radiation intensity without an object located in the measuring region. This means that, in particular, changes in the measurement values without an object to be measured in the measuring region can be observed by the evaluation apparatus, so that no disruption due to the object is present. The change in the measured radiation intensity can therefore, depending on the cause, be an increase or a reduction in the radiation intensity. For example, a corridor for a permissible intensity range can be defined for the evaluation. If this is departed from, the evaluation apparatus activates the flushing apparatus to intermittently and/or continuously flush the protective mesh with the flushing gas. This embodiment thus makes use in an advantageous manner of the fact that the measuring sensors themselves can detect a contamination of the protective mesh so that in particular the protective mesh can be cleaned by flushing as needed.

According to another embodiment, a reflector which reflects or deflects the measuring radiation can be arranged between the transmission apparatus and/or the receiving apparatus on one side and the measuring region on the other side. Such a reflector enables a greater flexibility with regard to the arrangement of the transmission apparatus and the receiving apparatus in relation to the measuring region with the object to be detected. This in turn allows an improved protection of the transmission apparatus and the receiving apparatus. It is then possible, for example, to measure the object from below without the transmission apparatus and the receiving apparatus needing to be arranged beneath the object. For example, the measuring radiation can be deflected by the reflector by approximately 90°.

According to another related embodiment, the reflector can be arranged between the protective mesh and the measuring region. It is then possible to measure the object from below, wherein the protective mesh also does not have to be arranged beneath the object. In this case, even if the reflector is arranged beneath the measuring region and the measurement therefore takes places from below, the protective mesh can be arranged such that any contaminants originating from the object to be detected fall away at the protective mesh. It is also conceivable to provide additional reflectors and protective meshes arranged over the circumference of the object as well as transmission and receiving apparatuses, wherein, for example, a protective mesh arranged above the measuring region can be arranged such that strongly heated rising air originating from the object to be detected passes by the protective mesh. In particular, the protective mesh(es) can be arranged in this case perpendicular to the measuring plane or parallel to a falling plane of contaminants and/or parallel to a rising plane of hot air. In the previously mentioned embodiments, the reflector may be subjected to increased contamination. However, especially reflectors for the measuring radiation discussed here are relatively insensitive in this regard. Of course, it would also alternatively be possible to arrange the protective mesh between the reflector and the measuring region for the object to be measured in order to also protect the reflector from contamination.

As already explained, the object to be detected according to the invention can be, for example, a strand-shaped object, in particular a tube-shaped object such as a metal tube, in particular a steel tube, or a plastic tube, or a glass tube, or an object lying basically in a plane, for example a plate, in particular a heavy plate, a hot strip plate or a cold strip plate. In this case, the device can be configured to detect the object to be detected while the object is still being formed or directly after a production line that determines the final shape of the object, in particular in a cooling line downstream of such as production line. For this purpose, the device can be correspondingly arranged on the production line and/or the cooling line of an installation for producing the object. In this respect, the invention also relates to a system comprising a production line and/or a cooling line of an installation for producing the object and a device according to the invention. As explained, especially in the case of such a measurement of a particularly rough measuring environment, a high risk of contaminants and very high temperatures can be assumed. In the region of such cooling regions, problems due to splashing water used as cooling liquid can also be expected. The device according to the invention is especially well suited for such use.

Correspondingly, an embodiment of a method for detecting an object using the disclosed device is provided. In the method according to the invention, the diameter and/or the wall thickness and/or the outer contour of the object can correspondingly be determined based on measurement values from the receiving apparatus. Furthermore, a process for producing the object can be controlled and/or regulated based on the measurement values from the receiving apparatus and/or based on the values determined for the diameter and/or the wall thickness and/or the outer contour of the object. In the method, the object can be detected in the region of a production line for the object while it is still being shaped or as soon as possible after the final shaping. The production line thereby gives the object its final shape. During such a measurement, a metal tube, for example, can still have temperatures of over 1000° C. and therefore still be glowing. For example, a glass tube can still have temperatures of over 2000° C. Metal dust and cinder can also occur in this region. In particular when producing plastic tubes, a calibration sleeve made of metal can also be provided, against which the, at this point in time still shapeable, plastic tube is sucked as explained, for example by applying a vacuum, to form its final shape. Such a calibration sleeve can be arranged in the region of a cooling tank for cooling the object. Cooling liquid such as cooling water can be injected such a cooling, tank to cool the object. The measurement according to the invention can also take place in the region of such a calibration sleeve or such a cooling tank. For this purpose, the calibration sleeve and/or the cooling tank can comprise one or more related measuring openings.

As already explained, at least one transmission apparatus and/or at least one receiving apparatus can be arranged, further according to the invention, beneath the object during the measurement.

BRIEF DESCRIPTION OF THE DRAWINGS

Exemplary embodiments of the invention will be explained in more detail with reference to figures. Schematically.

The same reference numbers refer to the same objects in the figures unless indicated otherwise.

DETAILED DESCRIPTION OF THE INVENTION

Figure 1:
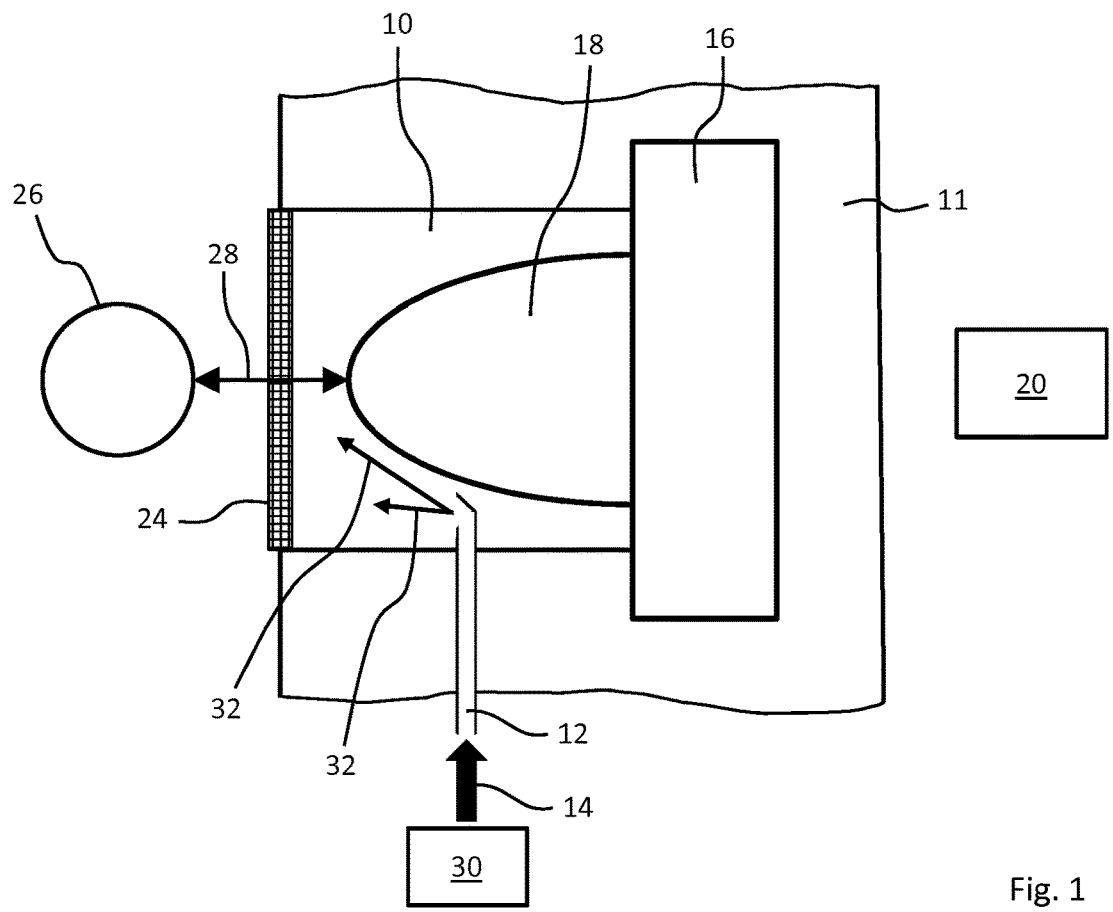
FIG. 1 illustrates a cross-sectional view of an embodiment of a device for detecting an object.

The device according to the invention shown in FIG. 1 has a housing 10, shown in sections, with a supply 12 for a flushing gas along the arrow 14. Flushing air, for example, can be used as the flushing gas. The housing 10 is held in a holding section 11. The device also comprises a transceiver 16 integrated into the housing 10, which transceiver forms a transmission apparatus for emitting measuring radiation and a receiving apparatus for receiving measuring radiation. In the example shown, the transceiver 16 has an antenna 18 configured as a hyperboloid, which, for example, can be comprised of Teflon®. The device also comprises an evaluation apparatus 20, to which the measurement results from the receiving apparatus are applied.

The housing 10 also has a housing opening 22 (FIG. 2) which is circular in the example shown and is provided with a protective mesh 24. The protective mesh 24 can, for example, be a glass fiber protective mesh. An object 26, in the example shown a tube-shaped object 26 such as a metal tube, in particular a steel tube, or a plastic tube, to be detected by the device is located in a measuring region. The tube-shaped object 26 can be conveyed along its longitudinal axis through the measuring region of the device, in FIG. 1 perpendicularly into the plane of the drawing, by means of a conveying apparatus of the device. The transmission apparatus of the transceiver 16 emits electromagnetic measuring radiation through the protective mesh 24 onto the outer contour oldie tube-shaped object 26, from which the electromagnetic radiation is reflected back to the transceiver 16 and thus to the receiving apparatus, as illustrated in FIG. 1 by the arrow 28. On this basis, the evaluation apparatus 20 can ascertain the distance between the transceiver 16 and the outer contour of the tube-shaped object 26 from a propagation delay measurement and thus infer other measurement variables, as is known per se. In particular, a distance can correspondingly be measured at multiple positions distributed over the circumference of the object 26 to determine the diameter and/or the wall thickness and/or the outer contour of the tube-shaped object 26.

A flushing apparatus 30 is provided to supply the flushing gas to the housing 10 during the measurement via the supply 12 corresponding to the arrow 14. As illustrated by the arrows 32 in FIG. 1, the supplied flushing gas escapes again to the outside into the environment through the protective mesh 24. This keeps the protective mesh 24 free of any contaminants. The flushing gas can be introduced by the flushing apparatus 30 continuously or intermittently before, during and or alter a measurement. For example, a radiation intensity received by the receiving apparatus of the transceiver 16 can be ascertained by the evaluation apparatus 20 at regular intervals, without or with an object 26 arranged in the measuring region. If this radiation intensity moves outside of a previously established permissible corridor, whether through an increase or reduction in the radiation intensity, the evaluation apparatus 20 can activate the flushing apparatus 30, for example, to perform an intermittent flushing.

Figure 2:
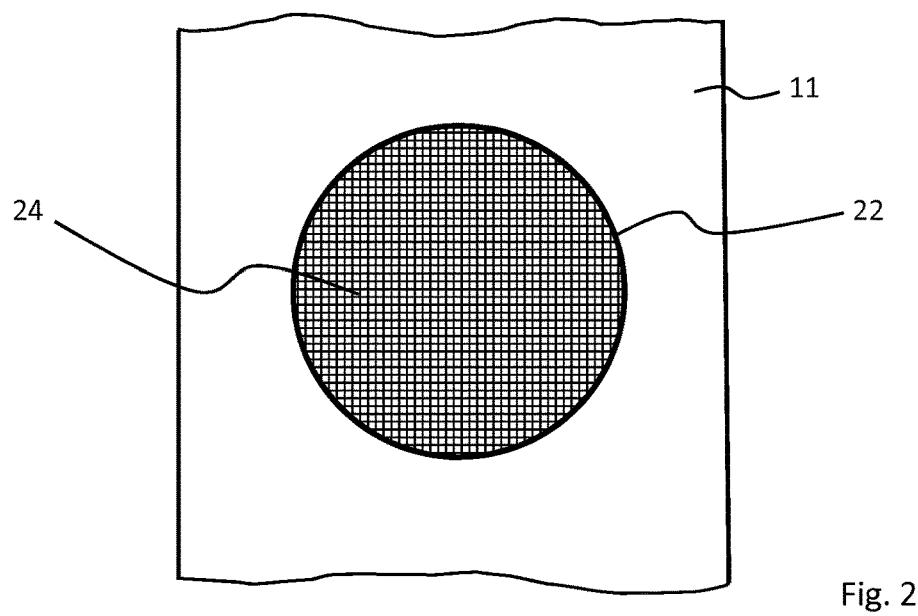
FIG. 2 illustrates a front view of the embodiment of the device for detecting an object from FIG. 1.
Figure 3:
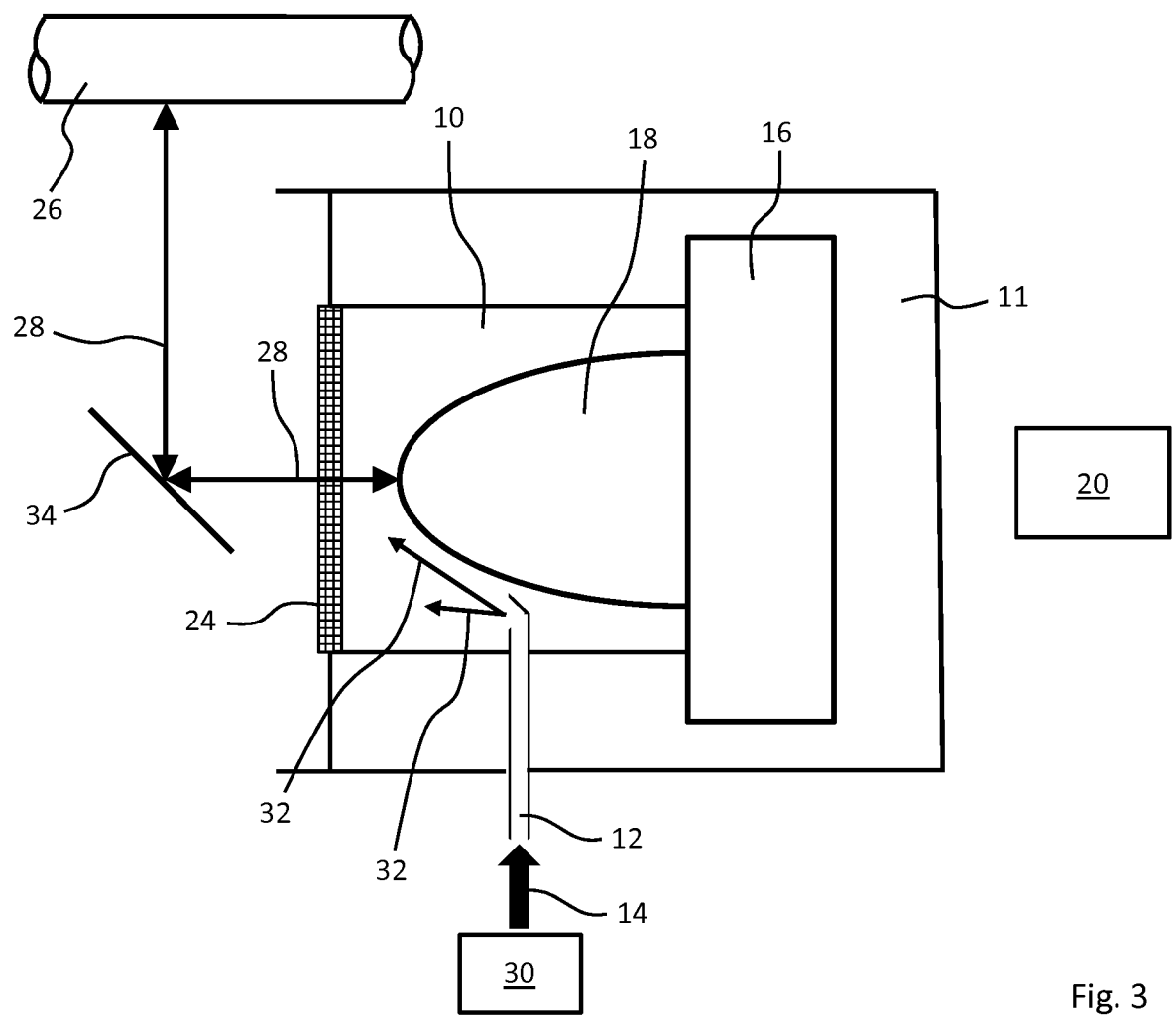
FIG. 3 illustrates a cross-sectional view of another embodiment of the device for detecting an object.

A second exemplary embodiment of the device is shown in FIG. 3 that largely corresponds to the exemplary embodiment according to FIGS. 1 and 2. The tube-shaped object 26 to be detected is shown in FIG. 3 rotated by 90° in relation to the representation from FIG. 1. The object 26 can again be conveyed along its longitudinal axis through the measuring region. In contrast to the exemplary embodiment according to FIGS. 1 and 2, the embodiment according to FIG. 3 shows a reflector 34 arranged between the transceiver 16 and the measuring region with the object 26 to be detected, which reflector 34 reflects or deflects the measuring radiation in the example shown basically perpendicularly, as illustrated in FIG. 3 by the arrows 28. In the example shown in FIG. 3, the reflector 34 is located between the protective mesh 24 and the measuring region with the object 26 to be detected. In this manner, the protective mesh 24 can be protected particularly securely from contaminants. Of course, it would also be alternatively conceivable in the exemplary embodiment shown in FIG. 3 to arrange the protective mesh 24 between the reflector 34 and the measuring region with the object 26 to be detected in order, for example, to protect the reflector 34. Additional transceivers 16 could also be arranged distributed over the circumference of the object 26, wherein a protective mesh 24 and reflector 34 can be provided in each case. The protective meshes can each be arranged in this case such that contaminants and/or hot air fall away or pass by.

Although the invention has been explained in the figures based on the example of the measurement of a tube-shaped object 26, the object could also be an object lying basically in a plane, for example a plate, in particular a heavy plate, a hot strip plate or a cold strip plate. At least one transmission apparatus and/or at least one receiving apparatus could also be arranged beneath the object during the measurement.

The invention claimed is:

1. A device for detecting an object conveyed through a measuring region, the device for detecting the object comprising:
   a transmission apparatus configured to emit measuring radiation onto an outer contour of the object, wherein the measuring radiation comprises a frequency in a range of one of gigahertz and terahertz;
   a receiving apparatus configured to receive the measuring radiation reflected by the object; and
   a protective mesh positioned between the measuring region and at least one of the transmission apparatus and the receiving apparatus, wherein the protective mesh is transparent to the measuring radiation and permeable to a gas;
   a flushing apparatus configured to flush the protective mesh with a flushing gas; and
   an evaluation apparatus configured to:
      receive measurement values from the receiving apparatus,
      determine at least one of: (1) a diameter; (2) a wall thickness; and (3) an outer contour of the object based on the measurement values; and
      activate the flushing apparatus to flush the protective mesh with the flushing gas when an intensity of the measuring radiation received by the receiving apparatus changes.

2. The device according to claim 1, wherein the transmission apparatus and the receiving apparatus are formed by a transceiver.

3. The device according to claim 1, wherein the protective mesh comprises a glass fiber fabric.

4. The device according to claim 1, wherein the transmission apparatus and the receiving apparatus are arranged in a housing defining a housing opening that faces the measuring region, and wherein the protective mesh covers the housing opening.

5. The device according to claim 1 wherein the flushing apparatus is configured to continuously flush the protective mesh with the flushing gas at at least one of: (1) a time before; (2) a time during; and (3) a time after a measurement.

6. The device according to claim 1, wherein the flushing apparatus is configured to intermittently flush the protective mesh with the flushing gas at at least one of: (1) a time before; (2) a time during; and (3) a time after a measurement.

7. The device according to claim 1, further comprising a reflector configured to deflect the measuring radiation, wherein the reflector is arranged between the measuring region and at least one of the transmission apparatus and the receiving apparatus.

8. The device according to claim 7, wherein the reflector is arranged between the protective mesh and the measuring region.

9. A method for detecting an object conveying through a measuring region, the method comprising:

emitting measuring radiation from a transmission apparatus onto an outer contour of the object, wherein the radiation comprises a frequency in a range of one of gigahertz and terahertz;

receiving the measuring radiation reflected by the object by a receiving apparatus;

positioning a protective mesh between the measuring region and at least one of the transmission apparatus and the receiving apparatus, wherein the protective mesh is transparent to the measuring radiation and permeable to a gas;

determining measurement values using the reflected measuring radiation;

determining at least one of: (1) a diameter; (2) a wall thickness; and (3) an outer contour of the object based on the measurement values; and flushing the protective mesh with a flushing gas when an intensity of the measuring radiation received by the receiving apparatus changes.

10. The method according to claim 9, wherein the object is detected in a region of a cooling line downstream of a production line for the object.

11. The method according to claim 9, wherein at least one transmission apparatus is arranged beneath the object during a measurement.

12. The method according to claim 11, wherein at least one receiving apparatus is arranged beneath the object during the measurement.

* * * * *